United States Patent Office 2,734,828
Patented Feb. 14, 1956

2,734,828
DEXTRAN COATING COMPOSITION

Harry A. Toulmin, Jr., Dayton, Ohio, assignor to The Commonwealth Engineering Company of Ohio, Dayton, Ohio, a corporation of Ohio No Drawing. Application May 6, 1953,
Serial No. 353,441

20 Claims. (Cl. 106—162)

This invention relates to coating compositions, such as lacquers and the like.

In U. S. Patent No. 2,236,386 to G. L. Stahly and W. W. Carlson, there are disclosed lacquers comprising organic solvent-soluble benzyl ethers of dextrans. While those lacquers have many advantages as compared to nitrocellulose lacquers, in that they dry readily, are non-inflammable, and are resistant to most common organic solvents and reagents, the coatings or films obtained by deposition of the lacquers on a suitable base are more hygroscopic than is desired for various purposes.

It is, therefore, an object of this invention to provide new coating compositions comprising the organic solvent-soluble benzyl dextrans which are non-hygroscopic and even water-repellant.

Another object is to provide new coating compositions comprising the benzyl dextrans which, on application to a base, dry rapidly to provide the base with a non-hygroscopic brilliant, hard, tenaciously adherent, durable coating or film.

The coating compositions of this invention comprise a blend of the organic solvent-soluble benzyl dextran and an ester of a dextran or dextran conversion product with a fatty acid containing between 8 and 18 carbon atoms, dissolved in a suitable volatile solvent.

The benzyl dextran may be prepared by any suitable method, as for example by the method described in U. S. Patents Nos. 2,203,702 and 2,203,703 to G. L. Stahly and W. W. Carlson, and which involves heating a solution of a dextran with benzyl chloride and sodium hydroxide for suitable time periods and at suitable temperatures until the benzyl radical is substituted for hydroxyl groups of the dextran and the resultant ether is soluble in organic solvents.

The esters of dextran with the higher fatty acids may also be prepared in any suitable manner. Methods for preparing them are disclosed in the pending application of L. J. Novak and J. T. Tyree, Serial No. 351,743, filed April 28, 1943. Thus, the dextran or a dextran derivative or conversion product containing free hydroxyl groups is reacted with an esterifying derivative of the higher fatty acid, and preferably a halide such as the chloride thereof, in the presence of an acid acceptor or binding agent such as an organic base, as for instance a tertiary heterocyclic amine of the type of quinoline, pyridine, N-methyl morpholine, etc., and in the presence of a substance in which the reaction product is at least partially solvated, that is dissolved or swollen, as it is formed during the reaction, which results in the reaction mass being maintained in a highly swollen or dissolved state and thus insures substantially uniform, homogeneous reaction between the dextran and the esterifying agent. Substances which dissolve or swell the ester as it is formed are, for example, xylene, toluene, dioxane, etc. In general, the reaction is carried out at temperatures between 100° C. and 155° C. for time periods varying inversely with the temperature between a half hour and three hours, both the temperature and the reaction depending on the boiling point of the mixture of acid acceptor and solvating agent used. Thus, if a mixture of quinoline and xylene is used, the reaction may be effected by heating the mass at from 150 and 155° C. for from one-half hour to an hour, whereas when a mixture of pyridine and toluene, which has a relatively low boiling point, is employed, the reaction is preferably run at temperatures of 100° to 115° C. for from one to three hours.

Proceeding in accordance with this last-mentioned embodiment the dextran high fatty acid ester is recovered from the crude reaction mix, in which it is at least partially dissolved, by washing the mixture with water to remove the hydrochloride of the organic base, e. g., pyridine hydrochloride or quinoline hydrochloride, removing the aqueous layer, adding a solvent for the ester to the residual mass, and precipitating the solution thus obtained into a non-solvent for the ester, such as a lower aliphatic alcohol, e. g., methanol, ethanol, isopropanol, etc., and filtering the ester, which may be further purified by reprecipitation, if desired, and dried.

In accordance with another embodiment of the invention, introduction of the higher fatty acid radical into the dextran molecule is effected by reacting the dextran or dextran conversion product containing free hydroxyl groups with the selected acid, in the presence of an "impeller" which may be a monohalogenated monobasic organic acid anhydride, and an esterification catalyst such as magnesium perchlorate at temperatures at which the reaction mixture remains in the liquid state, and which depend on the acid and dextran or dextran conversion product used, but which are, in general, in the range between 50° and 100° C., and for a time varying inversely with the temperature between one-half hour and two hours. The ester is isolated from the crude reaction mass by cooling the mass, dissolving it in a solvent therefor, and precipitating it into a non-solvent for the ester in which the chloracetic acid formed by the addition of by-product water from the reaction to the anhydride "impeller" remains in solution, and filtering to remove the ester, which is then dried in any suitable manner.

The higher fatty acids which may be used in the free acid condition or in the form of their chlorides, are those containing from 8 to 18 carbon atoms and including caprylic, pelargonic, capric, undecylic, lauric, tridecylic, myristic, pentadecylic, palmitic, margaric and stearic acids, and the corresponding chlorides. Two or more of the substantially pure saturated acids, or chlorides thereof, may be used, resulting in the production of mixed higher fatty acid esters of the dextran or its conversion product. Or commercial acids, which comprise mixtures, may be used. For example, there may be used commercial or technical grade stearic acid, which comprises a mixture of stearic and palmitic acids, and results in the production of dextran stearate-palmitate.

In general, the esterifying agent is used in an amount of from less than 1.0 to 10.0 or more parts thereof by weight per part of the dextran, for reaction times and at reaction temperatures generally inversely related to the relative proportions of dextran and esterifying agent, longer reaction times and higher temperatures being employed with amounts of the esterifying agent near the lower limit of the stated range, shorter reaction times and lower temperatures being used with amounts of the esterifying agent near the upper limit of the stated range.

The end products may have a D. S. (average degree of substitution or ratio of higher fatty acid radicals to anhydroglucopyranosidic units of the dextran) of from less than 1.0 to 3.0.

These higher saturated fatty acid esters of the dextrans are moisture-resistant to an extent depending on the D. S. and the particular fatty acid radicals introduced into the dextran molecule, as well as the dextran esterified. Those in which the D. S. approaches the theoretically possible maximum of 3.0 fatty acid radicals per anhydroglucopyranosidic unit, e. g. those in which the average D. S. is between about 2.5 and 3.0 are hydrophobic and soluble in organic solvents, particularly those of the non-polar type such as the halogenated hydrocarbons, e. g. chloroform, carbon tetrachloride, and the "Freons" (commercially available chlorofluoro-methanes of the type of "Freon 11"—a trichloromonofluoromethane, and "Freon 12"—a dichlorodifluoromethane) and in the aromatic hydrocarbons of the type of benzene, toluene and the xylenes. Since these solvents are also solvents for the benzyl dextrans, the ester and ether may be dissolved therein for application to a base, for instance to a metal base.

The solutions may be prepared in any convenient way. Thus the benzyl dextran and the selected fatty acid ester may be pre-mixed or pre-blended and then dissolved in the solvent, or either the ester or the ether may be dissolved, and the other added to the solution with stirring to insure a homogeneous composition.

The dextran esters and the benzyl dextran are compatible in all proportions and may be used in relative amounts of from 5 to 95% by weight of one and 95 to 5% of the other. However, for the present purposes it is preferred to employ the ester and ether in approximately equivalent amounts or to use an excess of the benzyl dextran. Thus, preferred coating compositions in accordance with the invention may comprise between 50 and 95% of the benzyl dextran and between 5 and 50% of the dextran fatty acid ester. Relatively small amounts of the ester are generally sufficient to render the coating non-hygroscopic when the average D. S. is between 2.0 and 3.0 and especially if the esters are derived from fatty acids having a higher carbon content in the stated range, i. e., from acids containing between 12 or 14 and 18 carbon atoms. Larger amounts of the esters may be required or desired if a low-substituted ester derived from an acid of lower carbon content is used.

The most suitable proportion of solvent to the mixture of benzyl dextran and dextran higher fatty acid ester will depend on the type of coating desired. It has been found that 20% solids and the balance solvents is a satisfactory proportion for some types of coatings. However, these proportions are not limiting and may be varied at the discretion of the operator.

The following examples are given to illustrate specific embodiments of the invention. It will be understood that the proportions and conditions given are relative and approximate in the sense that they may be modified depending on the variable factors involved in any particular coating problem.

*Example I*

About 15 parts of a chloroform-soluble benzyl dextran and about 5 parts of a dextran palmitate containing an average of 2.9 palmitoyl radicals per anhydroglucopyranosidic unit are dissolved in 80 parts of chloroform at room temperature.

This composition is applied to a metal base and the solvent is evaporated in air or under heating to 60° C. or higher, to provide the base with a hard, brilliant, tenacious coating which is water-repellent.

*Example II*

About 10 parts of benzene-soluble benzyl dextran about 10 parts of a dextran stearate containing an aver- of 2.9 stearoyl radicals per anhydroglucopyranosidic unit are dissolved in 80 parts of benzene.

The composition is applied to a metal base and dried in the air or at elevated temperature. A hard, brilliant, water-repellent and tenaciously adherent film or coating remains on the base after evaporation of the benzene.

These compositions dry rapidly, in about the same time as the compositions consisting essentially of the benzyl dextran and solvent. The coating is superior to that consisting essentially of benzyl dextran, however, in that it is more resistant to moisture pick-up and retention and, in the event that highly esterified esters as used in the foregoing examples are employed, the coating is hydrophobic and exhibits no tendency to pick-up moisture at ordinary or high relative humidities or when actually contacted with water. Water placed on the surface of the metal base or substrate carrying the hardened mixture of benzyl dextran and dextran palmitate or stearate, remains at the surface, from which it evaporates in the air.

The coating compositions may be applied to the base in any suitable way, as by brushing, roller coating, or spraying.

The compositions may be modified by the inclusion of various adjuvants such as dyes, pigments, and other effect materials. For instance, the compositions may be used as a vehicle for metallic particles such as is zinc dust.

The dextrans from which the benzyl ether and higher fatty acid esters are derived are high molecular weight, branched polysaccharides comprising anhydroglucopyranosidic units joined by molecular structural repeating linkages some, and apparently at least 50% of which, are alpha-1,6 linkages. The properties of the dextrans, including the extent of branching (the number and distribution of side groups or chains) and the molecular structural repeating alpha-1,6 to alpha-non-1,6 linkages ratios, may vary.

The dextran which is benzylated, and the dextran which is esterified, may be obtained by any method by which dextrans may be produced, may have a high molecular weight equivalent to that of a so-called "native" dextran produced by enzyme action on a sucrose-containing medium in the presence of bacteria, or a lower molecular weight equivalent to that of a "native" dextran which has been hydrolyzed or split as by means of acid or enzymatically. The molecular weight of the dextran may be in the range of 5,000 to a million or higher, as determined by light-scattering measurements.

These dextrans may be obtained in various ways. For example, they may be obtained by inoculating a nutrient medium containing sucrose, particular nitrogenous compounds, and certain inorganic salts with an appropriate microorganism such as those of the *Leuconostoc mesenteroides* and *L. dextranicum* types, and incubating the culture at the temperature most favorable to the growth of the particular microorganism.

In one method of obtaining a dextran by bacterial action, there is first prepared an aqueous nutrient medium which may have the following composition:

| | Percent by weight |
|---|---|
| Sucrose | 20 |
| Corn steep liquor | 2 |
| Monobasic potassium phosphate | 0.5 |
| Manganous sulfate | 0.002 |
| Sodium chloride | 0.50 |
| Water | Balance |

This medium is adjusted to a pH of between about 6.5 and about 7.5, preferably 7.2, and then sterilized. The material is cooled to room temperature and inoculated with a culture of the dextran-producing bacteria, for example, *Leuconostoc mesenteroides* B–512 (Northern Regional Research Laboratory classification) and incubated at 20° to 30° C. (optimum 25° C.) until a maximum yield of dextran has been attained; normally a period of between 12 and 48 hours will be used. The fermented product contains approximately 80–85% of water and is a thick turbid liquid.

Upon completion of the fermentation, which process renders the material somewhat acid, that is, to a pH of 3.5–5.5 (average 4.2), calcium chloride is added to the fermentate to bring the pH thereof to about 7.0 to 8.0.

This aids in the precipitation of phosphates. Thereafter acetone or alcohol, which may be a water-miscible aliphatic, such as methyl, ethyl or isopropyl, is added in sufficient quantity to precipitate the dextran and this brings down, with the dextran, occluded and adsorbed bacteria and nitrogenous and inorganic elements. To occasion complete precipitation of the dextran it may be desirable to allow the mix to stand for a relatively long period, such as about 6 hours.

A purer dextran may be obtained by adding an aliphatic alcohol to the fermentate at a pH between about 2.5 and 4.5. The precipitate thus obtained may be further purified by again precipitating it with alcohol. Several precipitations may be performed.

The dextran thus produced is a so-called "native" dextran having a high molecular weight and being, in the particular case, soluble in water at ordinary temperatures.

The dextran used to prepare the benzyl ether and the fatty acid esters may be a native or equivalent high molecular weight dextran, or it may be of lower molecular weight. The molecular weight may be between 5000 and $50 \times 10^6$ as determined by light scattering measurements. The dextran may be a product obtained by hydrolysis of a higher molecular weight dextran, the hydrolysis being effected in any suitable way as by means of acid or enzymatically, and followed or not by a fractionation step to obtain a fraction of uniform or more nearly uniform molecular weight. Such fractions may or may not be treated for the removal of pyrogens and coloring materials by known methods. The dextran may be a so-called "clinical dextran" such as is useful as a blood plasma extender.

The dextrans may be obtained by inoculating the culture medium with microorganisms other than *Leuconostoc mesenteroides* B–512. Thus, it may be, for instance, a water-soluble dextran obtained by inoculating the nutrient medium with one of the microorganisms bearing the following NRRL classifications: *Leuconostoc mesenteroides* B–119, B–1146, B–1190; or it may be a water-insoluble or substantially water-insoluble dextran obtained by inoculating the nutrient medium with the microorganisms *Leuconostoc mesenteroides* B–742, B–1191, B–1196, B–1208, B–1216, B–1120, B–1144, or B–523, *Streptobacterium dextranicum* B–1254, or *Betabacterium vermiforme* B–1139.

The invention is not limited to the use of benzyl ethers or higher fatty acid esters derived from dextrans produced under any particular set of conditions or using any particular microorganism. The dextran may be produced enzymatically, in the substantial absence of bacteria, for instance by cultivating an appropriate microorganism such as *Leuconostoc mesenteroides* B–512 to obtain a dextran-producing enzyme, isolating the enzyme, and introducing the enzyme into a sucrose-containing medium in which the dextran is produced by the action of the enzyme. Also, the dextran may be obtained by the bacterial conversion of 1,4 linkages of dextrin to 1,6 linkages of dextran, or in any other suitable manner.

It will be understood that while there have been described herein certain specific embodiments of this invention, it is not intended thereby to have it limited to or circumscribed by the specific details given, since the invention is susceptible of various modifications and changes which come within the spirit and scope of this disclosure and of the appended claims.

I claim:

1. As a new article of manufacture for use in a lacquer and the like, a composition comprising a blend of 50% to 95% of a benzyl ether of a dextran and 5% to 50% of an ester of a dextran with a saturated fatty acid containing from 8 to 18 carbon atoms, the ester containing, per anhydroglucopyranosidic unit, from less than 1.0 to 3.0 radicals derived from the fatty acid.

2. As a new article of manufacture for use in a lacquer and the like, a composition comprising a blend of 50% to 95% of a benzyl ether of a dextran and 5% to 50% of an ester of a dextran with a saturated fatty acid containing from 8 to 12 carbon atoms, the ester containing, per anhydroglucopyranosidic unit, from less than 1.0 to 3.0 radicals derived from the fatty acid.

3. As a new article of manufacture for use as a lacquer and the like, a composition comprising 50% to 95% of a benzyl ether of dextran, 5% to 50% of an ester of a dextran with a saturated fatty acid containing from 8 to 18 carbon atoms, and a halogenated hydrocarbon solvent, the ester containing, per anhydroglucopyranosidic unit, from less than 1.0 to 3.0 radicals derived from the fatty acid.

4. A composition as in claim 3 in which the dextran ester contains an average of between about 2.0 and 3.0 fatty acid radicals per anhydroglycopyranosidic unit.

5. As a new article of manufacture, for use as a lacquer and the like, a composition comprising 50% to 95% of a benzyl ether of a dextran, 5% to 50% of an ester of a dextran with a saturated fatty acid containing from 8 to 18 carbon atoms, and chloroform, the ester containing, per anhydroglucopyranosidic unit, from less than 1.0 to 3.0 radicals derived from the fatty acid.

6. As a new article of manufacture for use as a lacquer and the like, a composition comprising 50% to 95% of a benzyl ether of a dextran, 5% to 50% of an ester of a dextran with a saturated fatty acid containing from 8 to 18 carbon atoms, and carbon tetrachloride, the ester containing, per anhydroglucopyranosidic unit, from less than 1.0 to 3.0 radicals derived from the fatty acid.

7. As a new article of manufacture for use as a lacquer and the like, a composition comprising 50% to 95% of a benzyl ether of a dextran, 5% to 50% of an ester of a dextran with a saturated fatty acid containing from 8 to 18 carbon atoms, and an aromatic hydrocarbon solvent, the ester containing, per anhydroglucopyranosidic unit, from less than 1.0 to 3.0 radicals derived from the fatty acid.

8. As a new article of manufacture for use as a lacquer and the like, a composition comprising 50% to 95% of a benzyl ether of a dextran, 5% to 50% of an ester of a dextran with a saturated fatty acid containing from 8 to 18 carbon atoms, and benzene, the ester containing, per anhydroglucopyranosidic unit, from less than 1.0 to 3.0 radicals derived from the fatty acid.

9. As a new article of manufacture for use as a lacquer and the like, a composition comprising 50% to 95% of a benzyl ether of a dextran, 5% to 50% of an ester of a dextran with a saturated fatty acid containing from 8 to 18 carbon atoms, and toluene, the ester containing, per anhydroglucopyranosidic unit, from less than 1.0 to 3.0 radicals derived from the fatty acid.

10. As a new article of manufacture for use as a lacquer and the like, a composition comprising 50% to 95% of a benzyl ether of a dextran, 5% to 50% of an ester of a dextran with a saturated fatty acid containing from 8 to 18 carbon atoms, and a xylene, the ester containing, per anhydroglucopyranosidic unit, from less than 1.0 to 3.0 radicals derived from the fatty acid.

11. As a new article of manufacture for use as a lacquer and the like, a composition comprising 50% to 95% of a benzyl ether of a dextran, a 5% to 50% of a dextran palmitate containing an average of from about 2.0 to about 3.0 palmitoyl radicals per anhydroglycopyranosidic unit, and an organic solvent for the ether and ester.

12. As a new article of manufacture for use as a lacquer and the like, a composition comprising 50% to 95% of a benzyl ether of a dextran, 5% to 50% of a dextran palmitate containing an average of between about 2.0 and about 3.0 palmitoyl radicals per anhydroglucopyranosidic unit, and a halogenated hydrocarbon solvent.

13. As a new article of manufacture for use as a lacquer and the like, a composition comprising 50% to 95% of a benzyl ether of a dextran, 5% to 50% of a dextran palmitate containing an average of between about 2.0 and about 3.0 palmitoyl radicals per anhydroglycopyranosidic unit, and chloroform.

14. As a new article of manufacture for use as a lacquer and the like, a composition comprising 50% to 95% of a benzyl ether of a dextran, 5% to 50% of a dextran palmitate containing an average of between about 2.0 and about 3.0 palmitoyl radicals per anhydroglucopyranosidic unit, and carbon tetrachloride.

15. As a new article of manufacture for use as a lacquer and the like, a composition comprising 50% to 95% of a benzyl ether of a dextran, 5% to 50% of a dextran palmitate containing an average of between about 2.0 and about 3.0 palmitoyl radicals per anhydroglucopyranosidic unit, and benzene.

16. As a new article of manufacture for use as a lacquer and the like, a composition comprising 50% to 95% of a benzyl ether of a dextran, 5% to 50% of a dextran palmitate containing an average of between about 2.0 and about 3.0 palmitoyl radicals per anhydroglucopyranosidic unit, and xylene.

17. As a new article of manufacture for use as a lacquer and the like, a composition comprising 50% to 95% of a benzyl ether of a dextran, 5% to 50% of a dextran palmitate containing an average of between about 2.0 and about 3.0 palmitoyl radicals per anhydroglucopyranosidic unit, and toluene.

18. As a new article of manufacture for use as a lacquer and the like, a composition comprising 50% to 95% of a benzyl ether of a dextran, 5% to 50% of a dextran stearate containing an average of between about 2.0 and about 3.0 stearoyl radicals per anhydroglucopyranosidic unit, and a halogenated hydrocarbon solvent.

19. As a new article of manufacture for use as a lacquer and the like, a composition comprising 50% to 95% of a benzyl ether of a dextran, 5% to 50% of a dextran stearate containing an average of between about 2.0 and about 3.0 stearoyl radicals per anhydroglucopyranosidic unit, and chloroform.

20. As a new article of manufacture for use as a lacquer and the like, a composition comprising 50% to 95% of a benzyl ether of a dextran, 5% to 50% of a dextran stearate containing an average of between about 2.0 and about 3.0 stearoyl radicals per anhydroglucopyranosidic unit, and an aromatic hydrocarbon solvent.

References Cited in the file of this patent

UNITED STATES PATENTS

| | | |
|---|---|---|
| 2,229,941 | Stahly | Jan. 28, 1941 |
| 2,344,179 | Stahly | Mar. 14, 1944 |
| 2,503,624 | Luaces | Apr. 11, 1950 |